US012738475B2

(12) United States Patent
Hosono

(10) Patent No.: US 12,738,475 B2
(45) Date of Patent: Sep. 15, 2026

(54) DEVICE FOR PRODUCING ROLLED GRAIN LAYER AND METHOD OF PRODUCING ROLLED GRAIN LAYER USING SAME

(71) Applicant: ZEON CORPORATION, Tokyo (JP)

(72) Inventor: Yuto Hosono, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 19/123,067

(22) PCT Filed: Oct. 19, 2023

(86) PCT No.: PCT/JP2023/037857
§ 371 (c)(1),
(2) Date: Apr. 22, 2025

(87) PCT Pub. No.: WO2024/106127
PCT Pub. Date: May 23, 2024

(65) Prior Publication Data

US 2026/0121014 A1 Apr. 30, 2026

(30) Foreign Application Priority Data

Nov. 17, 2022 (JP) ................................ 2022-184214

(51) Int. Cl.
*H01M 4/04* (2006.01)
*B05C 1/08* (2006.01)
(Continued)

(52) U.S. Cl.
CPC ......... *H01M 4/0435* (2013.01); *B05C 1/0813* (2013.01); *B30B 3/04* (2013.01); *H01M 4/0404* (2013.01); *H01M 4/139* (2013.01)

(58) Field of Classification Search
CPC .. H01M 4/0435; H01M 4/0404; B05C 1/0813
See application file for complete search history.

(56) References Cited

U.S. PATENT DOCUMENTS 10,084,179 B2 * 9/2018 Tanihara ................... B05C 9/04
10,396,350 B2 * 8/2019 Hosono ............... H01M 4/0469
(Continued)

FOREIGN PATENT DOCUMENTS

CN 211334252 U * 8/2020 ............ B29C 43/24
JP 2016115569 A 6/2016
(Continued)

OTHER PUBLICATIONS

Apr. 29, 2025, International Preliminary Report on Patentability issued in the International Patent Application No. PCT/JP2023/037857.

(Continued)

*Primary Examiner* — Atul P. Khare
(74) *Attorney, Agent, or Firm* — KENJA IP LAW PC

(57) ABSTRACT

A production apparatus for a rolled particle layer comprises: a feeding unit for particles; a conveying unit for the fed particles; a support unit for the conveyed particles; a squeegee unit for leveling the particles to form a particle layer; a pair of stock guide units defining the particle layer's width; and a rolling unit rolling the particle layer to form a rolled particle layer. The squeegee unit has a thickness defining portion closest to the support unit. Each stock guide unit includes: a parallel portion including a face parallel to an end face of the squeegee unit and having upstream and downstream end portions respectively located upstream and downstream of the thickness defining portion; and a projecting portion disposed protruding toward the squeegee unit's width center. The stock guide units are disposed so that a distance W between the parallel portions corresponds to the rolled particle layer's width.

9 Claims, 8 Drawing Sheets

(51) Int. Cl.

| | |
|---|---|
| ***B30B 3/04*** | (2006.01) |
| ***H01M 4/139*** | (2010.01) |
| *H01M 4/02* | (2006.01) |

(56) References Cited

U.S. PATENT DOCUMENTS

| | | | |
|---|---|---|---|
| 2025/0018419 | A1 | 1/2025 | Fujii |
| 2025/0023010 | A1 | 1/2025 | Fujii |

FOREIGN PATENT DOCUMENTS

| | | | | |
|---|---|---|---|---|
| JP | 2019029308 | A | * | 2/2019 |
| JP | 2019075244 | A | * | 5/2019 |
| WO | 2023100971 | A1 | | 6/2023 |
| WO | 2023100973 | A1 | | 6/2023 |

OTHER PUBLICATIONS

Jan. 23, 2024, International Search Report issued in the International Patent Application No. PCT/JP2023/037857.

* cited by examiner

FIG.2 x
141
1
152
140C
152
150
150
140
140E
140E
151
151
W
130
151P
151P
160

DEVICE FOR PRODUCING ROLLED GRAIN LAYER AND METHOD OF PRODUCING ROLLED GRAIN LAYER USING SAME

FIELD

The present invention relates to a production apparatus for a rolled particle layer and a method for producing a rolled particle layer using the apparatus.

BACKGROUND

For example, a technique has been known in which a substrate is conveyed, granulated particles containing an electrode active material and a binder are fed onto the conveyed substrate, and the granulated particles are leveled using a squeegee unit that is in the form of a roll and then rolled by a rolling roll (Patent Literature 1).

CITATION LIST

Patent Literature

Patent Literature 1: Japanese Patent Application Laid-open No. 2016-115569

SUMMARY

Technical Problem

When a production method including a step of leveling particles, such as granulated particles containing an electrode active material, using a squeegee unit to continuously form a strip-shaped particle layer is performed, the particles may flow outward in the width direction of the particle layer beyond a target forming width of the rolled particle layer. In this case, the smoothness at the end portions in the width direction of the resulting rolled particle layer (edge smoothness) may be insufficient.

The present inventor has found that, in order to improve the smoothness at the end portions of the rolled particle layer, plate-shaped stock guide units are disposed on both sides, at both end faces, of the squeegee unit, whereby the smoothness at the end portions of the rolled particle layer can be improved.

On the other hand, the present inventor has found that when the stock guide units are disposed, the rolled particle mass per unit area (basis weight) at the end portions in the width direction of the rolled particle layer tends to be larger than the basis weight at the center portion in the width direction of the rolled particle layer.

If there are fluctuations in the basis weight across the width of the rolled particle layer, the characteristics of the rolled particle layer may become uneven in the width direction. For example, when a portion of the rolled particles in the layered body, which includes the substrate and the rolled particle layer, has a smaller basis weight, the rolling pressure in that portion decreases. As a result, the peel strength between the substrate and the rolled particle layer in that portion may become low.

Therefore, it is preferable that fluctuations in the basis weight across the width of the rolled particle layer are small. In particular, it is preferable that the basis weight at the end portions in the width direction of the rolled particle layer is close to the average basis weight across the width of the rolled particle layer.

Therefore, there is a need for a production apparatus for a rolled particle layer capable of producing a rolled particle layer having small fluctuations in the basis weight across the width thereof; and also a method for producing a rolled particle layer using the production apparatus for a rolled particle layer.

Solution to Problem

The present inventor has conducted intensive studies to solve the aforementioned problems. As a result, the present inventor has found that the aforementioned problems can be solved by providing a predetermined projecting portion in the stock guide unit, and thus the present invention has been completed.

That is, the present invention provides the following.

<1> A production apparatus for a rolled particle layer comprising:

- a feeding unit that feeds particles;
- a conveying unit that conveys the particles fed by the feeding unit;
- a support unit that supports the particles conveyed by the conveying unit;
- a squeegee unit disposed above the support unit with a gap between the squeegee unit and the support unit, the squeegee unit leveling the particles to form a particle layer;
- a pair of stock guide units that define a width of the particle layer; and
- a rolling unit that rolls the particle layer to form a rolled particle layer, wherein
- the squeegee unit has a thickness defining portion closest to the support unit,
- each of the pair of stock guide units includes:
  - a parallel portion that includes a face parallel to an end face of the squeegee unit and that has an upstream end portion located upstream relative to the thickness defining portion and a downstream end portion located downstream relative to the thickness defining portion; and
  - a projecting portion that is disposed upstream relative to the thickness defining portion and protrudes toward a center in a width direction of the squeegee unit, and
- the pair of stock guide units is disposed so that a distance W between the parallel portions of the respective stock guide units corresponds to a width of the rolled particle layer.

<2> The production apparatus for a rolled particle layer according to <1>, wherein the squeegee unit has a roll shape.

<3> The production apparatus for a rolled particle layer according to <1> or <2>, wherein the projecting portion included in each of the pair of stock guide units has a first face facing the support unit, and the support unit and the first face are separated from each other.

<4> The production apparatus for a rolled particle layer according to any one of <1> to <3>, wherein the projecting portion included in each of the pair of stock guide units is separated from the thickness defining portion upstream.

<5> The production apparatus for a rolled particle layer according to <3>, wherein a distance between the support unit and the first face of the projecting portion included in each of the pair of stock guide units is 0 mm or more and 20 mm or less.

<5-1> The production apparatus for a rolled particle layer according to <5>, wherein the projecting portion included in each of the pair of stock guide units is separated from the thickness defining portion upstream.

<6> The production apparatus for a rolled particle layer according to <4>, <5> or <5-1>, wherein a distance between the thickness defining portion and the projecting portion included in each of the pair of stock guide units is 1 mm or more and 60 mm or less.

<7> The production apparatus for a rolled particle layer according to any one of <1> to <6>, wherein the projecting portion included in each of the pair of stock guide units has a maximum thickness in a width direction of the squeegee unit of 0.1% or more and 25% or less, or 0.5% or more and 25% or less relative to the distance W.

<8> The production apparatus for a rolled particle layer according to claim 1, wherein the projecting portion included in each of the pair of stock guide units has a maximum thickness in a width direction of the squeegee unit of 1 mm or more and 100 mm or less.

<9> A method for producing a rolled particle layer using the production apparatus for a rolled particle layer according to any one of <1> to <8>, the method comprising:

- a step (A) of feeding the particles from the feeding unit;
- a step (B) of conveying the fed particles;
- a step (C) of disposing the conveyed particles on the support unit, leveling the particles using the squeegee unit, and forming the particle layer between the parallel portions of the pair of stock guide units; and
- a step (D) of rolling the particle layer using the rolling unit to form the rolled particle layer.

Advantageous Effects of Invention

According to the present invention, it is possible to provide a production apparatus for a rolled particle layer capable of producing a rolled particle layer having small fluctuations in the basis weight across the width thereof; and a method for producing a rolled particle layer using the production apparatus for a rolled particle layer.

BRIEF DESCRIPTION OF DRAWINGS

FIG. 2 is a top view schematically illustrating stock guide units, a squeegee unit, and a support unit that are included in the production apparatus according to the first embodiment.

DESCRIPTION OF EMBODIMENTS

Figure 1:
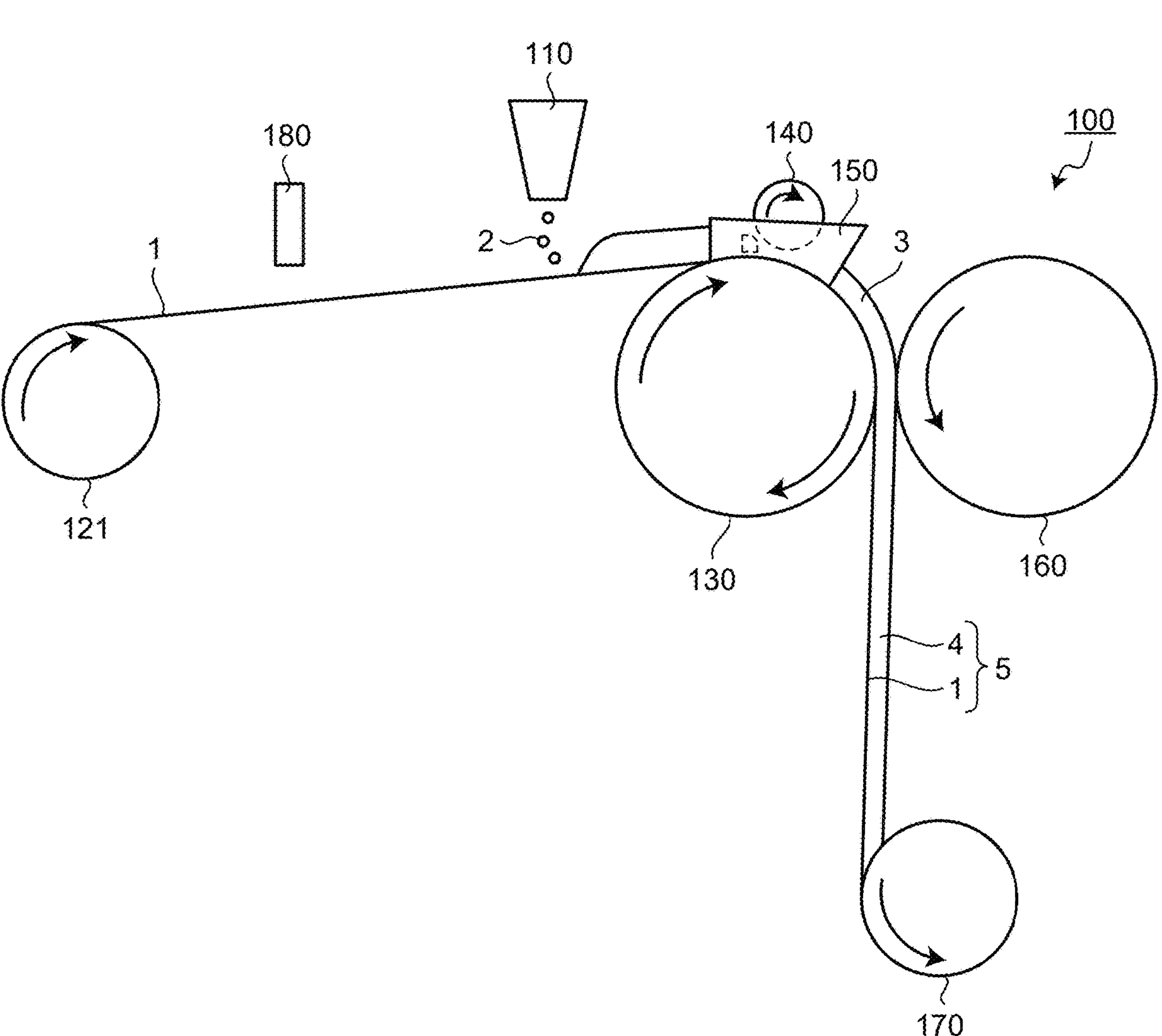
FIG. 1 is a side view schematically illustrating a production apparatus for a rolled particle layer according to a first embodiment of the present invention.

Hereinafter, the present invention will be described in detail with reference to embodiments and examples. However, the present invention is not limited to embodiments and examples described below, and may be freely modified for implementation without departing from the scope of claims of the present invention and the scope of their equivalents. Components of embodiments described below may be combined as appropriate. In the drawings, the same components are denoted by the same reference numerals, and descriptions thereof may be omitted.

In the following description, a "long-length" film refers to a film with the length that is 5 times or more the width of the film, and preferably a film with the length that is 10 times or more the width thereof, and specifically refers to a film with a length that allows a film to be wound up into a rolled shape for storage or transportation. The upper limit of the length of a film relative to the width of the film may be, but not particularly limited to, for example, 100,000 times or less the width.

In the following description, a direction of an element being "parallel", "perpendicular" or "orthogonal" may allow an error within the range of not impairing the advantageous effects of the present invention, for example, within a range of ±5°, ±3°, ±2°, or ±1°, unless otherwise specified.

In the following description, the terms "upstream" and "downstream" mean upstream and downstream, respectively, in terms of the conveyance direction of particles, in the production apparatus for a rolled particle layer, unless otherwise specified.

<1. Summary of Production Apparatus for Rolled Particle Layer>

A production apparatus for a rolled particle layer according to an embodiment of the present invention comprises:

- a feeding unit that feeds particles;
- a conveying unit that conveys the particles fed by the feeding unit;
- a support unit that supports the particles conveyed by the conveying unit;
- a squeegee unit disposed above the support unit with a gap between it and the support unit, the squeegee unit leveling the particles to form a particle layer;
- a pair of stock guide units that define a width of the particle layer; and
- a rolling unit that rolls the particle layer to form a rolled particle layer.

Herein, the squeegee unit has a thickness defining portion closest to the support unit, each of the pair of stock guide units includes: a parallel portion that includes a face parallel to an end face of the squeegee unit and that has an upstream end portion located upstream relative to the thickness defining portion and a downstream end portion located downstream relative to the thickness defining portion; and a projecting portion that is disposed upstream relative to the thickness defining portion and protrudes toward the center in the width direction of the squeegee unit, and the pair of stock guide units is disposed so that a distance W between the parallel portions of the respective stock guide units corresponds to the width of the rolled particle layer.

The production apparatus for a rolled particle layer according to the present embodiment is preferably an apparatus that continuously produces a strip-shaped rolled particle layer by using the conveying unit to continuously convey particles, using the squeegee unit to continuously form a particle layer, and using the rolling unit to continuously roll the particle layer.

The term "width of the particle layer" means, the dimension of the particle layer in a direction perpendicular to both the conveyance direction of the particle layer and the thickness direction thereof, unless otherwise specified.

The support unit that supports the particles may directly support the particles or indirectly support the particles (e.g., indirectly via a substrate).

According to the production apparatus for a rolled particle layer of the present embodiment, since the stock guide units each include the projecting portion, the amount of particles that flow to the end portions in the width direction of the particle layer is adjusted, and thus a rolled particle layer having small fluctuations in the basis weight across the width thereof can be produced.

Hereinafter, an embodiment of a production apparatus for a rolled particle layer will be described in detail with reference to the drawings.

<2. First Embodiment of Production Apparatus>

FIG. 1 is a side view schematically illustrating a production apparatus for a rolled particle layer according to a first embodiment of the present invention. As shown in FIG. 1, the production apparatus 100 for a rolled particle layer includes a substrate unwinding machine 121, a coating unit 180 for applying a binder coating liquid containing a binder onto a substrate 1, a feeding unit 110 that feeds particles 2, a support roll 130, a squeegee unit 140, a pair of stock guide units 150, a rolling roll 160 as the rolling unit, and a winding machine 170. The substrate unwinding machine 121, the coating unit 180, the feeding unit 110, the support roll 130, and the winding machine 170 are disposed in this order from upstream to downstream in terms of the conveyance direction of the particles 2.

The substrate unwinding machine 121 and the support roll 130 rotate in the same direction about their respective rotation axes to convey the substrate 1. The particles 2 are fed onto the substrate 1 that is being conveyed. The substrate 1 conveys the particles 2 downstream by the rotation of the substrate unwinding machine 121 and the support roll 130. Therefore, the substrate unwinding machine 121 and the support roll 130 cooperatively function as the conveying unit that conveys the particles 2 that have been fed by the feeding unit 110.

The support roll 130 functions as the conveying unit that conveys the particles 2, and also functions as the support unit that supports the particles 2 that are placed on the substrate 1 and conveyed.

The squeegee unit 140 is disposed above the support roll 130, which serves as the support unit, with a gap therebetween and levels the particles 2 to form a particle layer 3. In the production apparatus 100, each of the support roll 130, which serves as the support unit, and the squeegee unit 140 has a cylindrical shape (roller shape), and is configured to be rotatable about its rotation axis. The support roll 130 and the squeegee unit 140 are disposed so that their respective rotation axes are parallel to each other. In the production apparatus 100, the support roll 130 and the squeegee unit 140 are rotated in the same direction to allow the particles 2 to pass through the gap formed between the support roll 130 and the squeegee unit 140, whereby the particles 2 on the substrate 1 are leveled to form the particle layer 3 on the substrate 1.

In another embodiment, the squeegee unit 140 may be rotated in a direction opposite to the support roll 130 that rotates in a direction in which the substrate 1 is conveyed.

The rolling roll 160 and the support roll 130 function as the rolling unit and roll the particle layer 3 that has been formed on the substrate 1 to form a rolled particle layer 4. That is, the support roll 130 also functions as the rolling roll. Each of the rolling roll 160 and the support roll 130 is configured to be rotatable about its rotation axis. The rolling roll 160 and the support roll 130 are disposed so that their respective rotation axes are parallel to each other. The rolling roll 160 and the support roll 130 rotate in opposite directions to convey the rolled particle layer 4 downstream.

The layered body 5 including the rolled particle layer 4 and the substrate 1 is conveyed downstream and wound up by the winding machine 170.

(Stock Guide Unit)

Figure 2:
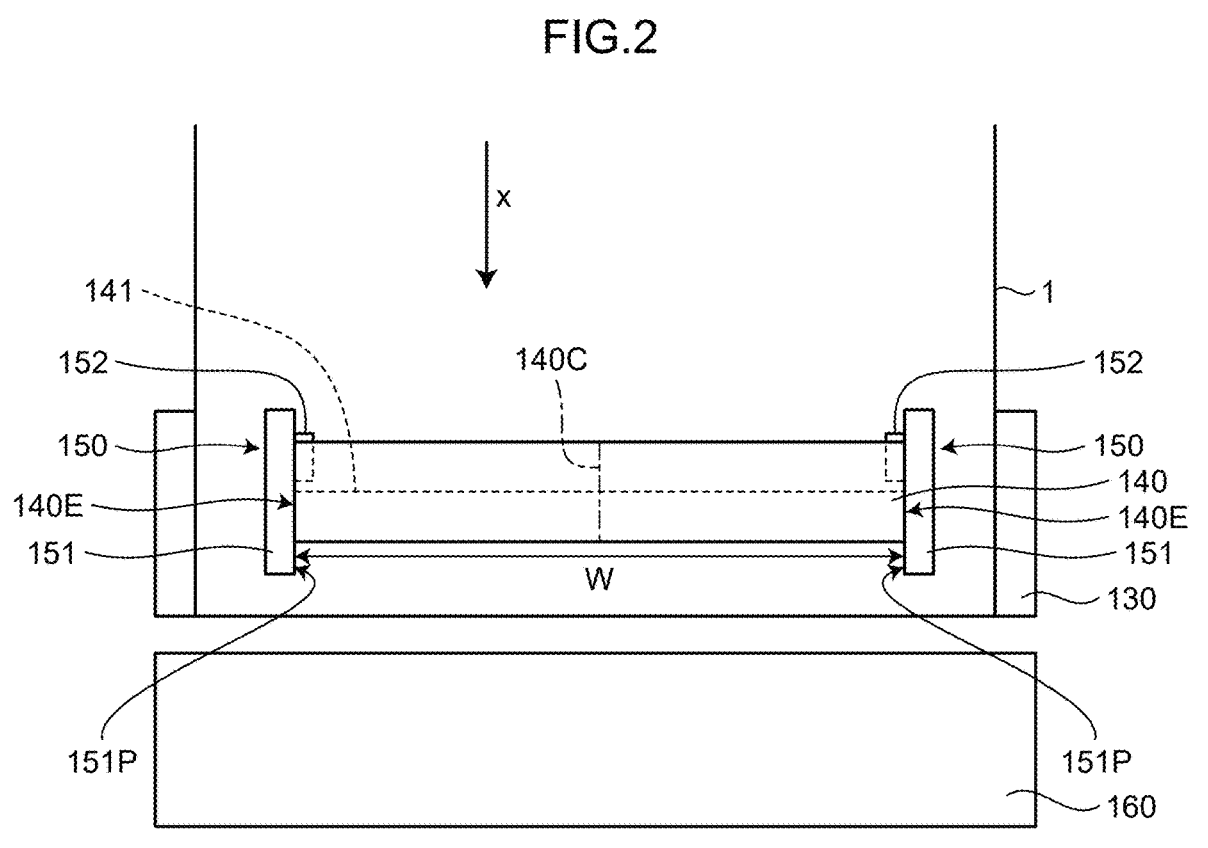
Figure 3A:
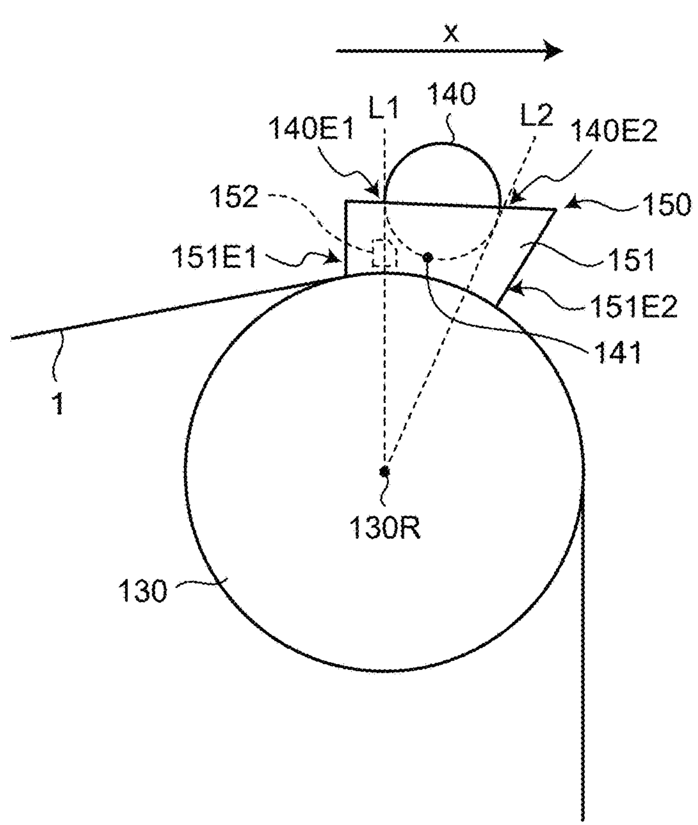
FIG. 3A is a side view schematically illustrating the stock guide unit, the squeegee unit, and the support unit that are included in the production apparatus according to the first embodiment.
Figure 3B:
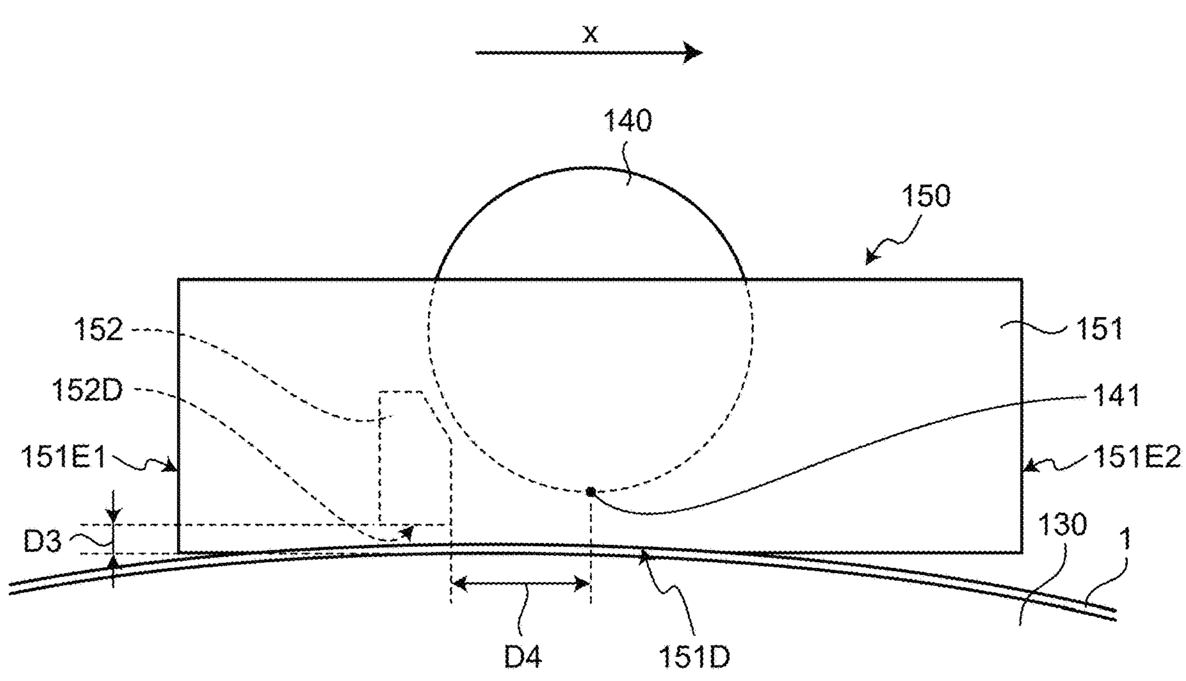
FIG. 3B is an enlarged view illustrating a part of FIG. 3A.
Figure 4:
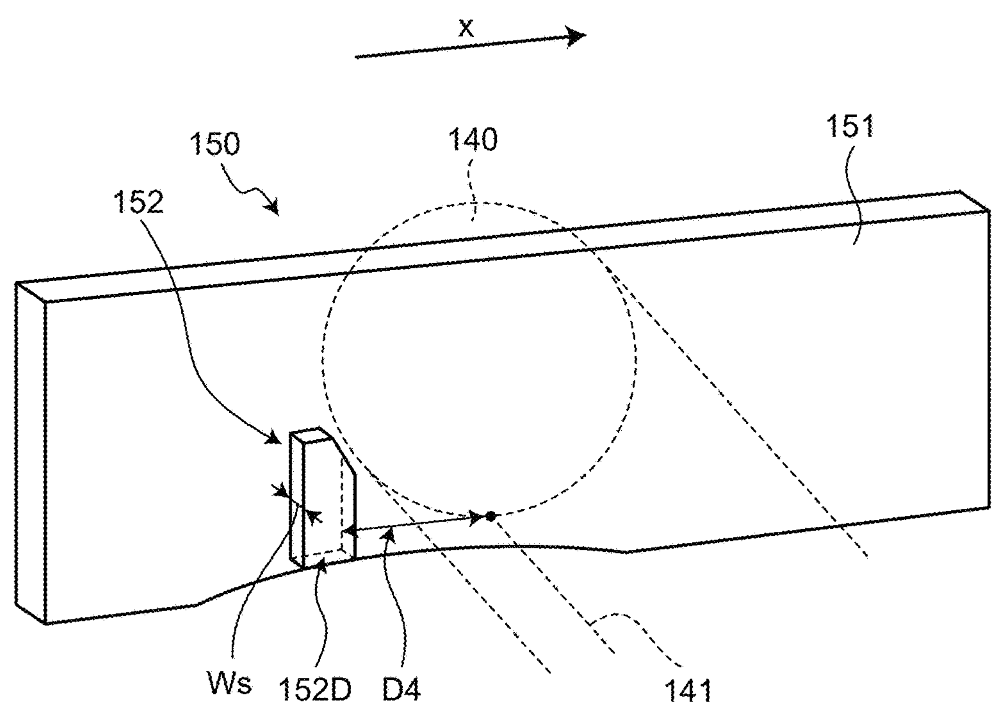
FIG. 4 is a perspective view schematically illustrating an example of the stock guide unit.

FIG. 2 is a top view schematically illustrating the stock guide units, the squeegee unit, and the support unit that are included in the production apparatus according to the first embodiment. FIG. 3A is a side view schematically illustrating the stock guide unit, the squeegee unit, and the support unit that are included in the production apparatus according to the first embodiment. FIG. 3B is an enlarged view illustrating a part of FIG. 3A. FIG. 4 is a perspective view schematically illustrating an example of the stock guide unit.

As illustrated in FIG. 2, the stock guide unit 150 includes a parallel portion 151 and a projecting portion 152.

The parallel portion 151 includes a face 151P parallel to an end face 140E of the squeegee unit 140.

The projecting portion 152 projects toward a center 140C in the width direction of the squeegee unit 140. Here, the width direction of the squeegee unit 140 is a direction perpendicular to the conveyance direction x of the particles 2.

The parallel portions 151, 151 are disposed so that a distance W between the parallel portions 151, 151 of the respective stock guide units 150, 150 corresponds to the width of the rolled particle layer 4. More specifically, the parallel portions 151, 151 are disposed so that the distance W between the faces 151P, 151P of the parallel portions 151, 151 corresponds to the width of the rolled particle layer 4.

As shown in FIG. 3A, the squeegee unit 140 has a thickness defining portion 141. The thickness defining portion 141 is the portion of the squeegee unit 140 that is closest to the support roll 130 that serves as the support unit. The thickness defining portion 141 is linear as shown in FIG. 2.

The parallel portion 151 included in the stock guide unit 150 has an upstream end portion 151E1 located upstream, in terms of the conveyance direction x of the particles 2, relative to the thickness defining portion 141, and a downstream end portion 151E2 located downstream, in terms of the conveyance direction x of the particles 2, relative to the thickness defining portion 141.

The upstream end portion 151E1 of the parallel portion 151 is located upstream, in terms of the conveyance direction x of the particles 2, relative to the upstream end portion 140E1 of the squeegee unit 140, and the downstream end portion 151E2 of the parallel portion 151 is located downstream, in terms of the conveyance direction x of the particles 2, relative to the downstream end portion 140E2 of the squeegee unit 140.

Here, the upstream end portion 140E1 of the squeegee unit 140 refers to a line (140E1 in FIG. 3A) at which a plane (L1 in FIG. 3A) and the peripheral surface of the squeegee unit 140 are in contact with each other. Herein, this plane includes a rotation axis 130R of the support roll 130 serving as the support unit and is in contact with the peripheral surface of the squeegee unit 140 on the upstream side. The downstream end portion 140E2 of the squeegee unit 140 refers to a line (140E2 in FIG. 3A) at which a plane (L2 in FIG. 3A) and the peripheral surface of the squeegee unit 140 are in contact with each other. Herein, this plane includes the rotation axis 130R of the support roll 130 serving as the support unit and is in contact with the peripheral surface of the squeegee unit 140 on the downstream side.

As described above, the upstream end portion 151E1 of the parallel portion 151 of the stock guide unit 150 is located upstream, in terms of the conveyance direction x of the particles 2, relative to the upstream end portion 140E1 of the squeegee unit 140. In addition, the downstream end portion 151E2 of the parallel portion 151 is located downstream, in terms of the conveyance direction x of the particles 2, relative to the downstream end portion 140E2 of the squeegee unit 140. Consequently, it is possible to effectively suppress the particles 2 from flowing to the outside from an area between the parallel portions 151, 151, this flow being in a direction along the rotation axis 130R of the support roll 130. Accordingly, it is possible to effectively suppress a decrease in edge smoothness and a decrease in yield of the particles 2.

The distance between each of the upstream end portion 151E1 and the downstream end portion 151E2 of the parallel portion 151 and the thickness defining portion 141 of the squeegee unit 140 may be appropriately selected depending on the distance between the support roll 130, which serves as the support unit, and the squeegee unit 140; the shapes, sizes, and positional relationships of the support roll 130 and the squeegee unit 140; and the like. The ratio (D1/R140) of a distance D1 between the upstream end portion 151E1 of the parallel portion 151 and the thickness defining portion 141 relative to a radius R140 of the squeegee unit 140 can be, for example, 0.05 or more, 0.5 or more, 1.0 or more, and more than 1.0, and can be, for example, 4.0 or less, 3.0 or less, and 2.0 or less. The ratio (D2/R140) of a distance D2 between the downstream end portion 151E2 of the parallel portion 151 and the thickness defining portion 141 relative to the radius R140 of the squeegee unit 140 can be, for example, 0.05 or more, 0.5 or more, 1.0 or more, and more than 1.0, and can be, for example, 4.0 or less, 3.0 or less, and 2.0 or less.

As shown in FIG. 3B, the parallel portion 151 has a face 151D that faces the peripheral surface of the support roll 130, which is the support unit. It is preferable that the face 151D is shaped to conform to the surface of the support unit opposite thereto. In the production apparatus 100, the face 151D is a curved surface that conforms to the peripheral surface of the support roll 130. In the cross section where the parallel portion 151 and the support roll 130 are cut along a plane perpendicular to the rotation axis of the squeegee unit 140, the ratio (R1/R0) of the radius of curvature R1 of the face 151D relative to the radius of curvature R0 of the peripheral surface of the support roll 130 is, for example, 0.95 or more, and preferably 0.98 or more, and is, for example, 1.10 or less, and preferably 1.05 or less. The ratio (R1/R0) is ideally 1.00, where the radius of curvature R0 of the peripheral surface of the support roll 130 and the radius of curvature R1 of the face 151D are the same. In another embodiment, the face 151D of the parallel portion 151 may be a flat surface.

The parallel portion 151 of the stock guide unit 150 may be in direct contact with the support roll 130 that serves as the support unit. The parallel portion 151 may be indirectly in contact with the support roll 130 via another member (for example, the substrate 1), or may be separated from the support roll 130. In the present embodiment, the parallel portion 151 is configured to be indirectly in contact with the support roll 130, which serves as the support unit, via the substrate 1.

The degree to which the parallel portion 151 and the support roll 130 serving as the support unit are brought into contact with each other can be appropriately adjusted after examining the influence of the contact of the parallel portion 151 with the support roll 130 on the support roll 130 or the substrate 1.

For example, the ratio of the contact length of the parallel portion 151 to the circumferential length of the support roll 130 serving as the support unit is preferably 7.5% or more, more preferably 7.7% or more, and still more preferably 10% or more, and is preferably 17.5% or less, more preferably 17% or less, still more preferably 13.5% or less, and particularly preferably 13% or less.

The parallel portion 151 preferably has a low friction with the substrate 1. Specifically, the coefficient of static friction between the parallel portion 151 and the substrate 1 is preferably 0.50 or less, and more preferably 0.40 or less. The coefficient of static friction between the parallel portion 151 of the stock guide unit 150 and the substrate 1 is ideally 0, and may be 0.04 or more in terms of a lower limit condition. The coefficient of static friction between the parallel portion 151 and the substrate 1 can be measured in accordance with JIS K7125.

As the coefficient of static friction between the parallel portion 151 and the substrate 1 becomes smaller, the adhesion between the particles 2 and the parallel portion 151 also tends to decrease. Therefore, the smaller the coefficient of static friction between the parallel portion 151 and the substrate 1 is, the more effectively the reduction in the smoothness at the end portion due to the adhesion of the particles 2 to the parallel portion 151 of the stock guide unit 150 can be suppressed.

In addition, the face 151D of the parallel portion 151 and the support roll 130 serving as the support unit may have a gap g. The size of the gap g is preferably adjusted to such an extent that the flow of the particles 2 from the gap g can be suppressed. For example, the size of the gap g is preferably 70% or less of the volume-average particle diameter (D50) of the particles 2, and more preferably 50% or less, and is preferably 10% or more, and more preferably 20% or more. By setting the size of the gap g within the above-mentioned range, the flow of the particles 2 from the gap g can be suppressed and the influence on the substrate 1 can be reduced.

Here, the volume-average particle diameter (D50) of the particles 2 is a 50% volume-average particle diameter measured in a dry manner and calculated using a laser diffraction-type particle size distribution measurement device (for example, Microtrac MT3300EX II; manufactured by MicrotracBEL Corp.). The 50% volume-average particle diameter is the particle diameter at a point where the cumulative frequency accumulated from the smaller diameter side on the obtained particle size distribution (on a volume basis) reaches 50%. The average particle diameter in the examples is also the 50% volume-average particle diameter (D50) calculated from the measurement of the above-mentioned method.

As shown in FIGS. 3B and 4, the projecting portion 152 has a first face 152D facing the peripheral surface of the support roll 130 that serves as the support unit. In the present embodiment, the first face 152D has a rectangular shape. In the present embodiment, the first face 152D is separated from the peripheral surface of the support roll 130. Since the first face 152D and the support roll 130 that serves as the support unit are separated from each other, the particles 2 are fed to the gap between the first face 152D and the peripheral surface of the support roll 130. As a result, a part of the particles 2 that have been blocked by the projecting portion 152 flows to the end portion in the width direction of the particle layer 3, and the fed amount of the particles 2 at the end portion in the width direction of the particle layer 3 falls more in line with the amount at other portions of the layer. Therefore, fluctuations in the basis weight across the width of the rolled particle layer 4 can be effectively reduced.

In yet another embodiment, the first face of the projecting portion may be in contact with the peripheral surface of the support roll via the substrate.

The distance D3 between the first face 152D and the support roll 130, which serves as the support unit, can be appropriately adjusted according to the conveyance speed (line speed) of the substrate, and is, for example, preferably 0 mm or more, more preferably 0.08 mm or more, and still more preferably 0.3 mm or more, and is preferably 20 mm or less, more preferably 15 mm or less, and still more preferably 10 mm or less.

The first face 152D of the projecting portion 152 may be a curved surface that conforms to the peripheral surface of the support roll 130 that serves as the support unit, or may be a flat surface.

As shown in FIG. 3B, the projecting portion 152 is separated from the thickness defining portion 141 upstream, in terms of the conveyance direction x of the particles 2. As a result, in the vicinity of the thickness defining portion 141, the particles 2 flow to the face 151P of the parallel portion 151 in FIG. 2. Therefore, it is possible to suppress the thickness at the end portion in the width direction of the particle layer 3 from becoming smaller than the thickness at the center portion in the width direction of the particle layer 3. As a result, fluctuations in the basis weight across the width of the rolled particle layer 4 can be reduced.

The distance D4 between the projecting portion 152 and the thickness defining portion 141 is preferably smaller than the distance between the upstream end portion 151E1 of the parallel portion 151 and the thickness defining portion 141. As a result, in the vicinity of the thickness defining portion 141, it is possible to adjust the amount of the particles 2 flowing to the face 151P of the parallel portion 151 in FIG. 2 to an appropriate amount and also suppress the thickness at the end portion in the width direction of the particle layer 3 from becoming larger than the thickness at the center portion in the width direction of the particle layer 3. As a result, fluctuations in the basis weight across the width of the rolled particle layer 4 can be reduced.

The distance D4 between the projecting portion 152 and the thickness defining portion 141 is, for example, preferably 1 mm or more, more preferably 10 mm or more, and still more preferably 20 mm or more, and is preferably 60 mm or less, more preferably 55 mm or less, and still more preferably 50 mm or less.

The maximum thickness Ws of the projecting portion 152 in the width direction of the squeegee unit 140 is preferably 1 mm or more, more preferably 5 mm or more, and still more preferably 8 mm or more, and is preferably 100 mm or less, more preferably 50 mm or less, and still more preferably 30 mm or less.

The maximum thickness Ws of the projecting portion 152 in the width direction of the squeegee unit 140 is, for example, preferably 0.1% or more, more preferably 0.5% or more, still more preferably 18 or more, and still more preferably 2% or more, and is preferably 25% or less, more preferably 15% or less, and still more preferably 10% or less, relative to the distance W between the parallel portions 151, 151 of the stock guide units 150 (specifically, a distance between the faces 151P, 151P, or a width of the rolled particle layer).

The thickness of the parallel portion 151 in the width direction of the squeegee unit 140 may be set such that the particles 2 can be held between the faces 151P, 151P of the parallel portions 151, 151. The thickness of the parallel portion 151 may be, for example, 10 mm or more, and may be, for example, 30 mm or less.

(Modification of Projecting Portion)

The shape of the projecting portion 152 of the stock guide unit 150 is not limited to the shape illustrated in FIG. 4, and may be another shape that projects toward the center 140C in the width direction of the squeegee unit 140.

Figure 5:
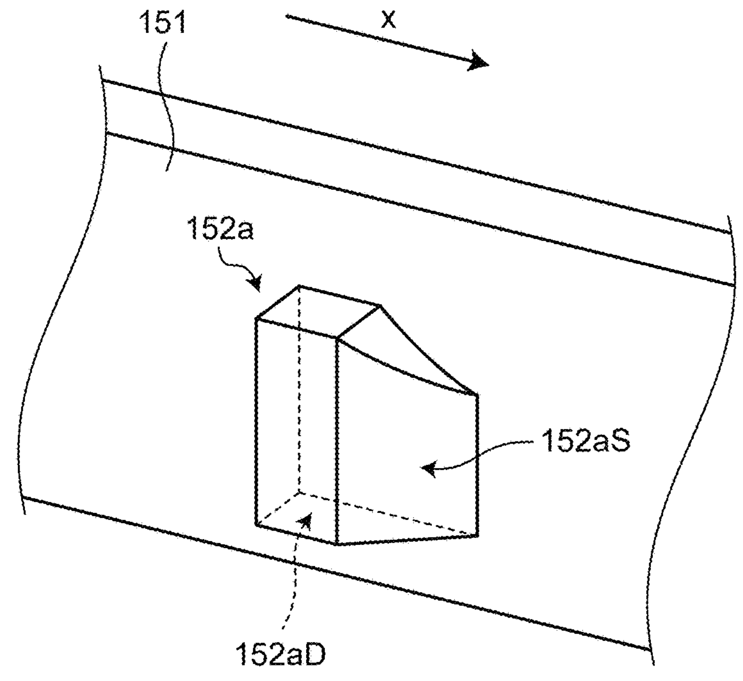
FIG. 5 is a perspective view schematically illustrating an example of a projecting portion.

FIG. 5 is a perspective view schematically illustrating an example of the projecting portion. As illustrated in FIG. 5, a projecting portion **152*a* has a face 152*a*D, which faces the support unit, with a trapezoidal shape. In addition, the projecting portion 152*a* has a face 152*a*S that becomes closer to the parallel portion as the face extends downstream, in terms of the conveyance direction x of the particles 2**.

Figure 6:
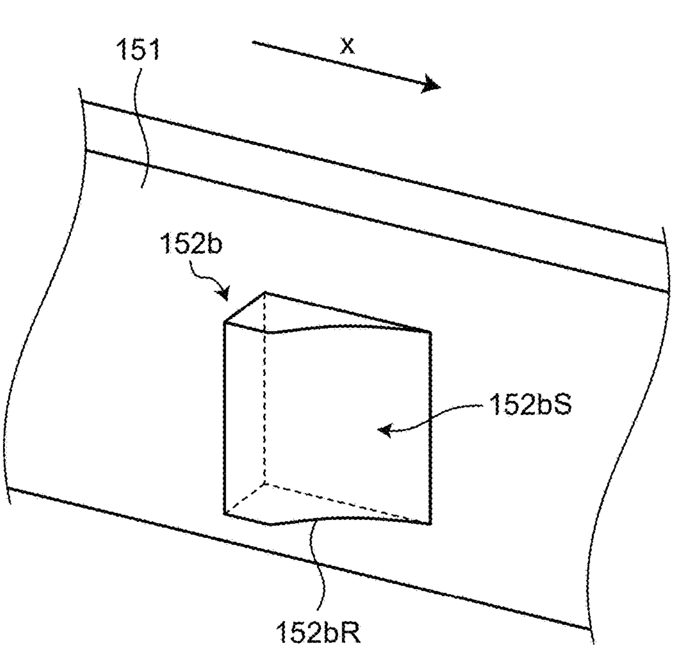
FIG. 6 is a perspective view schematically illustrating another example of the projecting portion.

FIG. 6 is a perspective view schematically illustrating another example of the projecting portion. As illustrated in FIG. 6, the projecting portion **152*b* has a face that faces the support unit and has a curved portion 152*b*R which has a shape that becomes closer to the parallel portion as the portion extends downstream, in terms of the conveyance direction x of the particles 2. In addition, the projecting portion 152*b* has a curved surface 152*b*S that becomes closer to the parallel portion as the surface extends downstream, in terms of the conveyance direction x of the particles 2**.

Since the projecting portion has a face that becomes closer to the parallel portion as the face extends downstream, in terms of the conveyance direction x of the particles 2, the fed particles 2 flow more smoothly to the parallel portion. As a result, fluctuations in the basis weight across the width of the rolled particle layer 4 can be more effectively reduced.

Materials constituting the stock guide unit are not particularly limited. Examples of the materials for the stock guide unit may include resins such as polytetrafluoroethylene (PTFE), an acrylonitrile-butadiene-styrene copolymer (ABS), polypropylene (PP), polystyrene (PS), polyethylene (PE), ultra-high polymer polyethylene, monomer casting nylon (UMC), polyvinyl chloride (PVC), polyacetal, and a methacrylic resin.

The parallel portion 151 and the projecting portion 152 may be formed as separate members, may be assembled as an integral stock guide unit 150, or may be formed as an integral member.

(Rolling Unit)

The support roll (rolling roll) 130, which serves as the rolling unit, and the rolling roll 160 roll the particle layer 3 to form the rolled particle layer 4. The support roll 130 and the rolling roll 160, which serve as the rolling rolls, roll the particle layer 3 by applying pressure in a direction perpendicular to the surface direction of the particle layer 3 to form the rolled particle layer 4. In the rolling unit, the particles are compressed, whereby the adhesion between the particles can be enhanced, and the adhesion between the substances contained in the particles can be enhanced. As a result, the strength of the rolled particle layer 4 can be increased.

The pressing pressure on the particle layer 3 can be adjusted by adjusting the gap between the support roll 130 and the rolling roll 160 that serve as the rolling rolls. For example, the pressing pressure can be adjusted by adjusting the difference between the size of the gap between the support roll 130, which serves as the support unit, and the squeegee unit 140 and the size of the gap between the support roll 130 and the rolling roll 160 that serve as the rolling rolls. In this manner, the density of the rolled particle layer 4 can also be adjusted. The gap between the support roll 130 and the rolling roll 160 is usually adjusted so as to be narrower than the gap between the support roll 130 and the squeegee unit 140. The specific distance can be appropriately adjusted depending on the thickness and density of the rolled particle layer 4.

Examples of the material constituting the peripheral surfaces of the support roll 130 and the rolling roll 160, which serve as the support rolls, may include rubber, metal, and inorganic materials.

The rolling roll 160 may have a mechanism for heating the peripheral surface thereof. Thus, the particle layer 3 can be rolled while being heated. By rolling the particle layer 3 while heating, the binder that can be contained in the particles 2 can be softened or melted, so that the particles 2 can be more firmly bound to each other.

(Feeding Unit)

The feeding unit 110 feeds the particles 2. In the present embodiment, it feeds a desired amount of the particles 2 onto the substrate 1 that is being conveyed by the substrate unwinding machine 121 and the support roll 130 that serve as the conveying unit. As the feeding unit 110, for example, a hopper can be used. The hopper usually includes a container portion for storing particles, an inlet for charging particles into the container portion, and an outlet for discharging particles from the container portion.

The feeding unit 110 is usually positioned upstream relative to the squeegee unit 140, where it can feed the particles 2 onto the substrate 1 that is being conveyed. The feeding unit 110 is preferably disposed so that the particles 2 can be fed to a central region in a direction (width direction) orthogonal to the conveyance direction of the substrate 1 that is being conveyed.

Specifically, it is preferable to dispose the outlet of the feeding unit 110 in a range of a distance from the center in the width direction of the substrate 1 to preferably 50% or less, or preferably 45% or less, or preferably 40% or less of the width of the substrate 1. The position of the end portion of the outlet of the feeding unit 110 in the width direction of the substrate 1 is preferably within a range of 40% or more and 50% or less of the width of the substrate 1 from the center in the width direction of the substrate 1.

The dimension of the outlet of the feeding unit 110 in the width direction of the substrate 1 (the longitudinal direction of the outlet) is preferably 80% or more, and preferably 100% or less, of the width of the substrate 1.

In another embodiment, the outlet of the feeding unit 110 may be disposed within a range of a distance from the center in the width direction of the substrate 1 to be, for example, 40% or less of the width of the substrate 1, or for example, 30% or less of the width of the substrate 1.

The distance from the surface of the substrate 1 to the outlet of the feeding unit 110 can be appropriately selected depending on the amount of the particles 2 that will be fed and the width of the substrate 1.

The feeding unit 110 usually feeds the particles 2 such that the basis weight of the rolled particle layer 4 to be produced is adjusted to a desired amount.

(Coating Unit)

The coating unit 180 applies a binder coating liquid onto the substrate 1 to form a binder coating liquid layer. By feeding the particles 2 onto the binder coating liquid layer, the particles 2 can be brought into more close contact with the substrate 1. Examples of the coating unit 180 may include a slot die head, a gravure head, a bar coating head, and a knife coating head. In another embodiment, the production apparatus may not include a coating unit.

(Collection Unit)

The winding machine 170 serving as the collection unit is disposed downstream relative to the support roll 130 and the rolling roll 160 that serve as the rolling unit, and winds up and collects the substrate 1 on which the rolled particle layer 4 has been formed. In another embodiment, the production apparatus may not include a collection unit.

<3. Second Embodiment of Production Apparatus>

Figure 7:
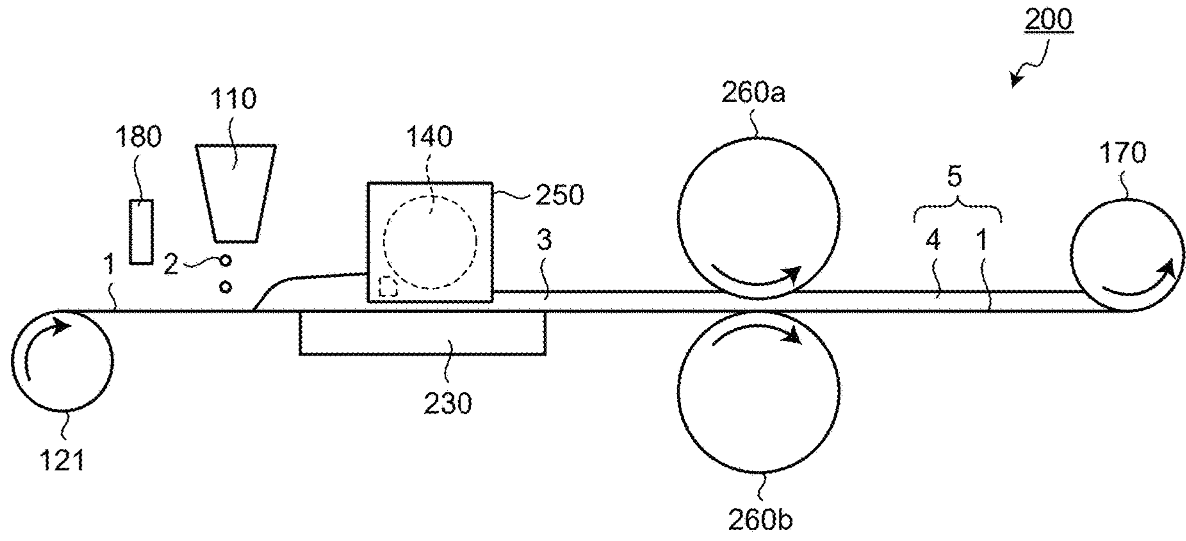
FIG. 7 is a side view schematically illustrating a production apparatus for a rolled particle layer according to a second embodiment of the present invention.
Figure 8:
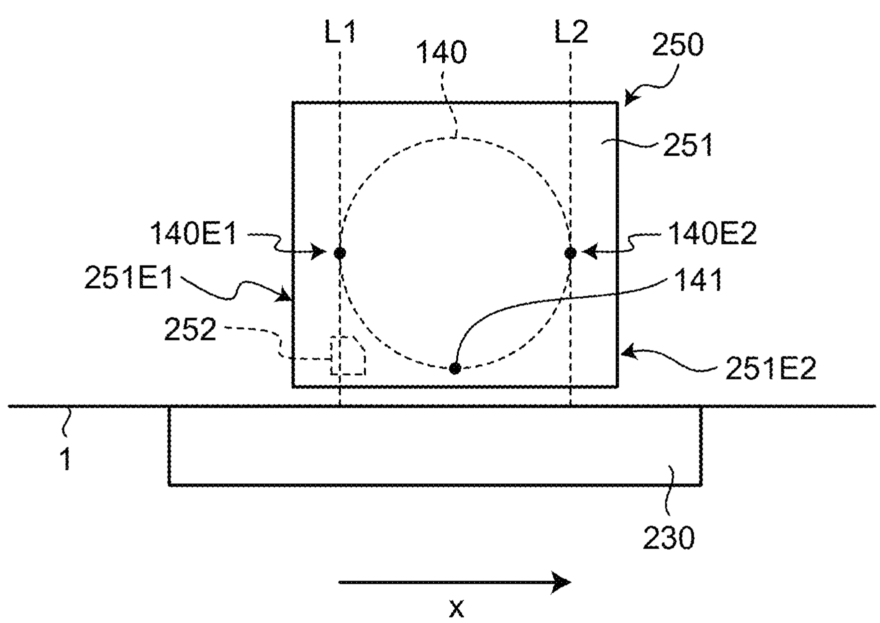
FIG. 8 is a side view schematically illustrating a stock guide unit, a squeegee unit, and a support board included in the production apparatus according to the second embodiment.

FIG. 7 is a side view schematically illustrating a production apparatus for a rolled particle layer according to a second embodiment of the present invention. FIG. 8 is a side view schematically illustrating a stock guide unit, a squeegee unit, and a support board included in the production apparatus according to the second embodiment. As illustrated in FIG. 7, the production apparatus 200 for a rolled particle layer includes a substrate unwinding machine 121, a coating unit 180, a feeding unit 110, a support board 230 serving as the support unit, a squeegee unit 140, a pair of stock guide units 250, rolling rolls 260*a*, 260*b* as the rolling unit, and a winding machine 170. The substrate unwinding machine 121, the coating unit 180, the feeding unit 110, the support board 230, and the winding machine 170 are disposed in this order from upstream to downstream in terms of the conveyance direction of the particles 2.

The substrate unwinding machine 121 and the rolling rolls 260*a*, 260*b* rotate about their respective rotation axes in a direction in which the substrate 1 is conveyed downstream. The particles 2 are fed onto the substrate 1 and conveyed together with the substrate 1. The substrate unwinding machine 121 and the rolling roll 260*a*, 260*b* rotate to convey the particles 2 downstream together with the substrate 1. Therefore, the substrate unwinding machine 121 and the rolling rolls 260*a*, 260*b* cooperatively function as the conveying unit that conveys the particles 2 fed by the feeding unit 110.

The support board 230 has a plate shape and functions as the support unit that supports the particles 2. The squeegee unit 140 is disposed above the support board 230, which serves as the support unit, with a gap therebetween, and levels the particles 2 to form a particle layer 3.

As illustrated in FIG. 8, a parallel portion 251 included in the stock guide unit 250 has an upstream end portion 251E1 located upstream, in terms of the conveyance direction x of the particles 2, relative to the thickness defining portion 141, and a downstream end portion 251E2 located downstream, in terms of the conveyance direction x of the particles 2, relative to the thickness defining portion 141.

The upstream end portion 251E1 of the parallel portion 251 is located upstream, in terms of the conveyance direction x of the particles 2, relative to the upstream end portion 140E1 of the squeegee unit 140, and the downstream end portion 251E2 of the parallel portion 251 is located downstream, in terms of the conveyance direction x of the particles 2, relative to the downstream end portion 140E2 of the squeegee unit 140.

Here, the upstream end portion 140E1 of the squeegee unit 140 refers to a line (140E1 in FIG. 8) at which a plane (L1 in FIG. 8) and the peripheral surface of the squeegee unit 140 are in contact with each other. Herein, the plane is perpendicular to the surface of the support board 230 serving as the support unit and is in contact with the squeegee unit 140 on the upstream side. The downstream end portion 140E2 of the squeegee unit 140 refers to a line (140E2 in FIG. 8) at which a plane (L2 in FIG. 8) and the peripheral surface of the squeegee unit 140 are in contact with each other. Herein, this plane is perpendicular to the surface of the support board 230 serving as the support unit, and is in contact with the squeegee unit 140 on the downstream side.

With such a configuration, similarly to the stock guide unit 150, it is possible to effectively suppress the particles 2 from flowing from an area between the parallel portions 251, 251 to the outside in the width direction (the direction perpendicular to the conveyance direction of the particles 2) of the support board 230 serving as the support unit. Accordingly, it is possible to effectively suppress a decrease in edge smoothness and a decrease in yield of the particles 2.

The distance between each of the upstream end portion 251E1 and the downstream end portion 251E2 of the parallel portion 251 and the thickness defining portion 141 of the squeegee unit 140 may be appropriately selected. The ratio (D1/R140) of a distance D1 between the upstream end portion 251E1 of the parallel portion 251 and the thickness defining portion 141 relative to a radius R140 of the squeegee unit 140 and the ratio (D2/R140) of a distance D2 between the downstream end portion 251E2 of the parallel portion 251 and the thickness defining portion 141 relative to the radius R140 of the squeegee unit 140 may be the same as those of examples and preferred examples described in the production apparatus 100.

The parallel portion 251 may be in direct contact with the support board 230 serving as the support unit. The parallel portion 251 may be indirectly in contact with the support board 230 via another member (for example, the substrate 1), or may be separated from the support board 230.

Similarly to the parallel portion 151 in the first embodiment, the parallel portion 251 preferably has a small friction with the substrate 1. The coefficient of static friction between the parallel portion 251 and the substrate 1 may be the same as those of examples and preferred examples for the coefficient of static friction between the parallel portion 151 and the substrate 1.

The projecting portion 252 of the stock guide unit 250 may have the same configuration as that of the projecting portion 152 that projects from the parallel portion 151 described in the production apparatus 100 except that it projects from the parallel portion 251.

The rolling rolls 260*a*, 260*b* serving as the rolling unit roll the particle layer 3 that has been formed on the substrate 1, thereby forming the rolled particle layer 4. Each of the rolling rolls 260*a*, 260*b* is configured to be rotatable about its rotation axis. The rolling rolls 260*a*, 260*b* are disposed so that their respective rotation axes are parallel to each other. The rolling rolls 260*a*, 260*b* rotate in opposite directions to convey the rolled particle layer 4 downstream.

The gap between the rolling roll 260*a* and the rolling roll 260*b* can be adjusted similarly to the gap between the support roll 130 and the rolling roll 160.

Examples of the material constituting the rolling rolls 260*a*, 260*b* may include the same examples as those for the materials constituting the peripheral surface of the rolling roll 160. Each of the rolling rolls 260*a*, 260*b* may have a mechanism for heating the peripheral surface thereof similarly to the rolling roll 160.

<4. Third Embodiment of Production Apparatus>

Figure 9:
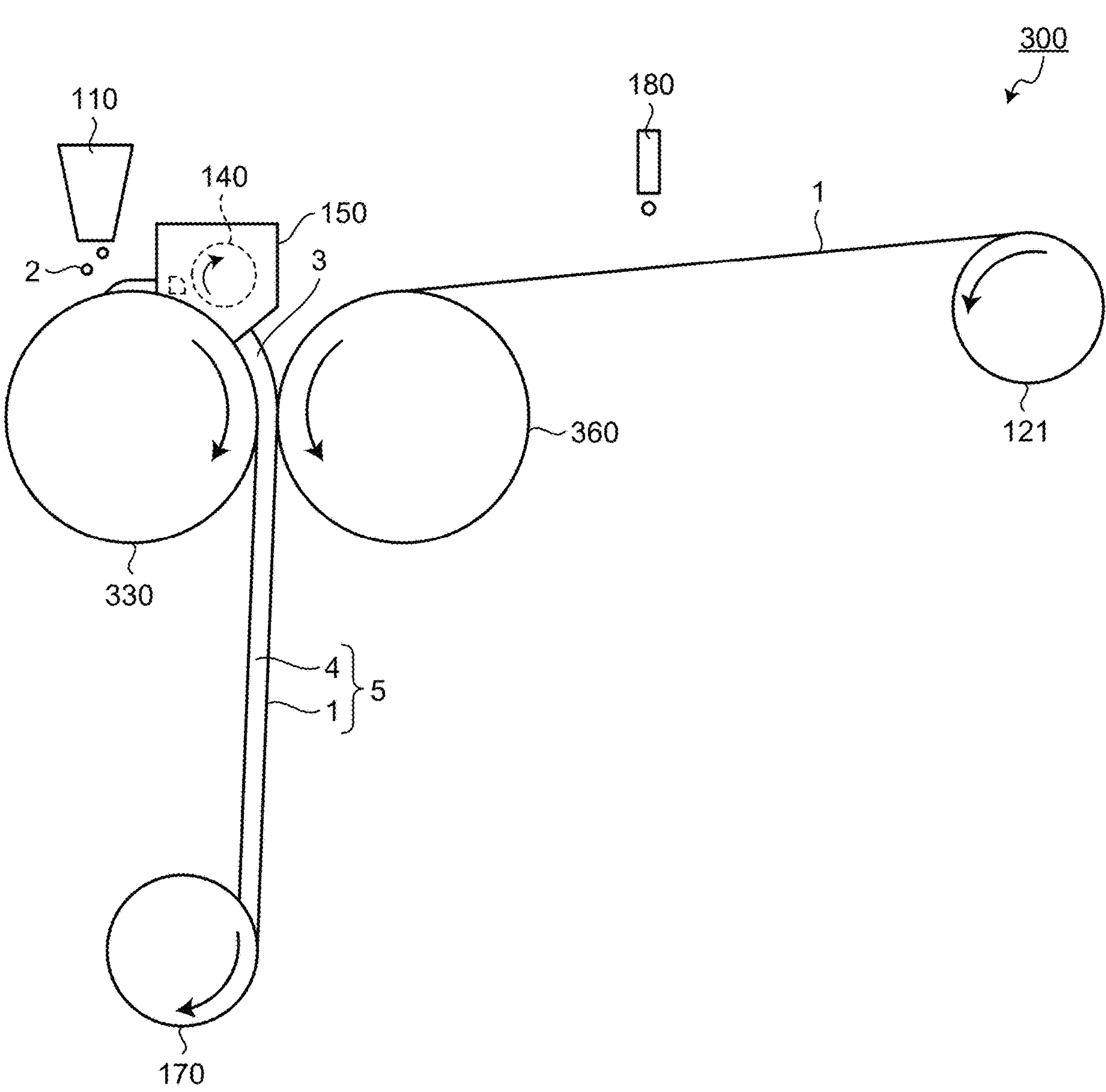
FIG. 9 is a side view schematically illustrating a production apparatus for a rolled particle layer according to a third embodiment of the present invention.

FIG. 9 is a side view schematically illustrating a production apparatus for a rolled particle layer according to a third embodiment of the present invention.

The production apparatus 300 includes a feeding unit 110, a support roll 330, a squeegee unit 140, a pair of stock guide units 150, a rolling roll 360, a substrate unwinding machine 121, a coating unit 180, and a winding machine 170. The feeding unit 110, the support roll 330, and the winding machine 170 are disposed in this order from upstream to downstream in terms of the conveyance direction of the particles 2.

The substrate 1 is unwound from the substrate unwinding machine 121 and is conveyed downstream by the rolling roll 360.

The support roll 330 functions as the conveying unit that conveys the particles 2 fed from the feeding unit 110, and also functions as the support unit that supports the particles 2. Furthermore, as will be described later, the support roll 330 also functions, together with the rolling roll 360 as a pair, as the rolling unit for rolling the particle layer 3.

The particles 2 supported by the peripheral surface of the support roll 330 are conveyed downstream by the rotation of the support roll 330. When passing through a gap between the support roll 330 and the squeegee unit 140, the squeegee unit 140 levels the particles 2 to form the particle layer 3.

The particle layer 3 is rolled between the substrate 1, which has been conveyed by the rolling roll 360, and the support roll 330 to form the rolled particle layer 4, and also the formed rolled particle layer 4 is transferred to the substrate 1. The rolled particle layer 4 transferred to the substrate 1 is wound up and collected by the winding machine 170 as a layered body 5 including the substrate 1 and the rolled particle layer 4.

The production apparatus 300 may have the same configuration as that described for the production apparatus 100 except for the above-described matters.

<5. Fourth Embodiment of Production Apparatus>

Figure 10:
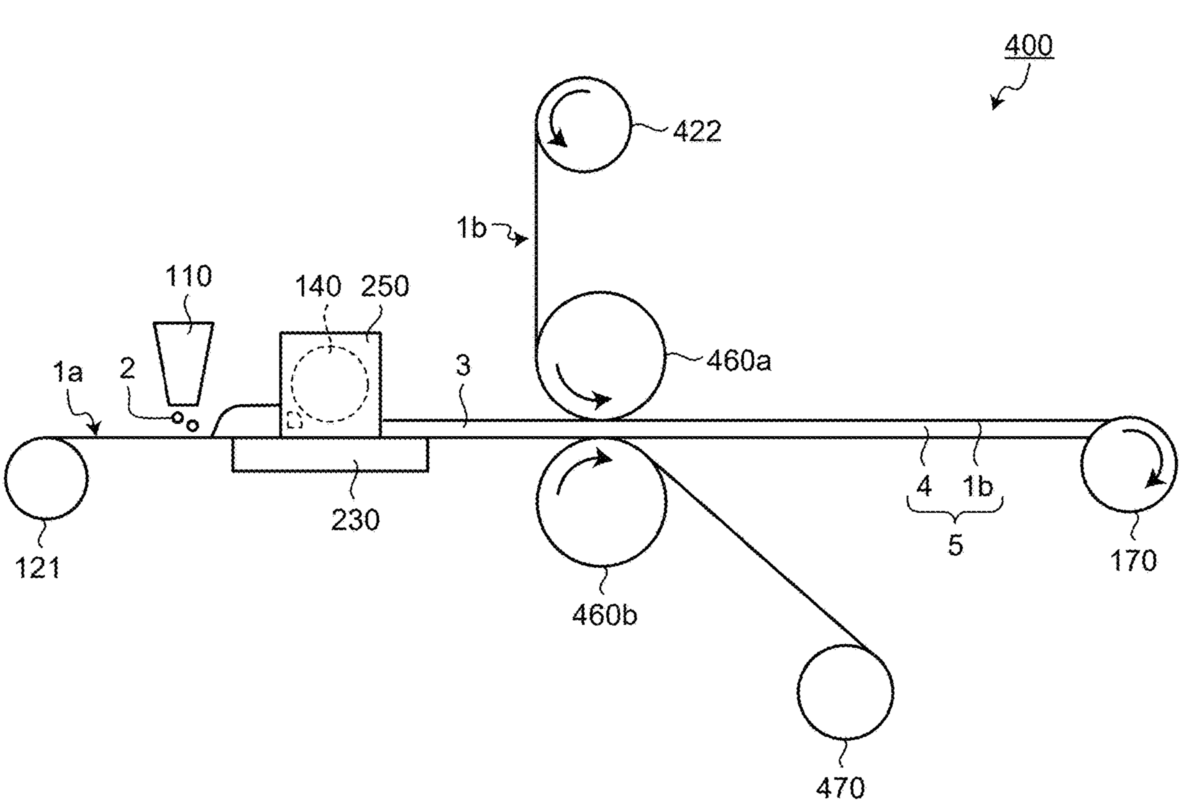
FIG. 10 is a side view schematically illustrating a production apparatus for a rolled particle layer according to a fourth embodiment of the present invention.

FIG. 10 is a side view schematically illustrating a production apparatus for a rolled particle layer according to a fourth embodiment of the present invention.

The production apparatus 400 includes substrate unwinding machines 121, 422, a feeding unit 110, a support board 230, a squeegee unit 140, a pair of stock guide units 250, rolling rolls 460*a*, 460*b*, a substrate winding machine 470, and a winding machine 170.

The substrate unwinding machine 121, the feeding unit 110, the support board 230, and the winding machine 170 are disposed in this order from upstream to downstream in terms of the conveyance direction of the particles 2.

The substrate unwinding machine 121 and the rolling rolls 460*a*, 460*b* rotate about their respective rotation axes in a direction in which a substrate 1*a* is conveyed downstream. The particles 2 are fed onto the substrate 1*a* and the particles 2 are conveyed downstream together with the substrate 1*a*. Therefore, the substrate unwinding machine 121 and the rolling rolls 460*a*, 460*b* cooperatively function as the conveying unit that conveys the particles 2 that have been fed by the feeding unit 110.

The substrate 1*b* is unwound from the substrate unwinding machine 422 and is conveyed downstream by the rolling roll 460*a*.

The rolling rolls 460*a*, 460*b*, which serve as the rolling unit, roll the particle layer 3 formed on the substrate 1*a* to form the rolled particle layer 4, and transfer the same to a substrate 1*b*. Each of the rolling rolls 460*a*, 460*b* is configured to be rotatable about its rotation axis. The rolling rolls 460*a*, 460*b* are disposed so that their respective rotation axes are parallel to each other. The rolling rolls 460*a*, 460*b* rotate in opposite directions to convey the rolled particle layer 4 downstream.

The rolling roll 460*b* transfers the rolled particle layer 4 to the substrate 1*b*, and then conveys the substrate 1*a* separated from the rolled particle layer 4 downstream. The substrate 1*a* is wound up and collected by the substrate winding machine 470.

The rolled particle layer 4 transferred to the substrate 1*b* is conveyed downstream by the rolling rolls 460*a*, 460*b*, and is wound up and collected by the winding machine 170.

The production apparatus 400 includes the support board 230 that serves as the support unit and a pair of stock guide units 250. However, in another embodiment, the production apparatus 400 may include a support roll 130 that serves as the support unit and a pair of stock guide units 150. The production apparatus 400 may also include a coating unit 180.

<6. Method for Producing Rolled Particle Layer>

A method for producing a rolled particle layer according to an embodiment of the present invention is a production method using the production apparatus for a rolled particle layer described above, comprising:

a step (A) of feeding the particles from the feeding unit;

a step (B) of conveying the fed particles;

a step (C) of disposing the conveyed particles on the support unit, leveling the particles using the squeegee unit, and forming the particle layer between the parallel portions of the pair of stock guide units; and a step (D) of rolling the particle layer using the rolling unit to form the rolled particle layer.

In the production method of the present embodiment, disposing the particles on the support unit includes a case of disposing the particles on the support unit so that the particles are in direct contact with the support unit, and a case of disposing the particles on the support unit via the substrate.

According to the production method of the present embodiment, it is possible to produce a rolled particle layer having small fluctuations in the basis weight across the width thereof.

The production method of the present embodiment is preferably a production method further including, for example, a step of feeding a substrate before the step (A), and performing the steps (A) to (D) on the substrate. Specifically, the production method is preferably a production method using the production apparatus for a rolled particle layer according to the first embodiment or the second embodiment described above.

Hereinafter, the respective steps in the production method of the present embodiment will be described.

(Step (E): Substrate Feeding Step)

A step (E) is a step of feeding a substrate before the step (A), and specifically, a step of feeding a substrate from the upstream side of the feeding unit of the production apparatus.

As the substrate, a long-length substrate is usually fed.

Examples of the specific substrate may include: metal foils formed of aluminum, platinum, nickel, tantalum, titanium, stainless steel, copper, and other alloys; films containing electroconductive materials (e.g., carbon, electroconductive macromolecular materials); paper; fabric cloths formed of natural fibers, macromolecular fibers, and the like; and macromolecular resin films or sheets. The substrate may be appropriately selected therefrom depending on the intended purpose. Examples of the polymers that can be contained in the macromolecular resin films or sheets may include a polyester such as polyethylene terephthalate and polyethylene naphthalate, a polyimide, a polypropylene, a polyphenylene sulfide, a polyvinyl chloride, an aramid, PEN, and PEEK.

Among these, when electrode sheets for lithium ion battery electrodes are to be produced, the preferable substrate may be a metal foil, a carbon film, and an electroconductive macromolecular film, more preferably a metal foil. Among these, it is preferable to use a copper foil, an aluminum foil, or an aluminum alloy foil from the viewpoint of electroconductivity and withstand voltage. The substrate may be subjected to a surface treatment such as a coating film treatment, a punching process, a buffing process, a sand blasting process, and/or an etching process.

The thickness of the substrate is, for example, 1 μm or more, and preferably 5 μm example, 1000 μm or less, and preferably 800 μm or less. The substrate may have any given width.

(Step (A): Feeding of Particles)

The step (A) is a step of feeding the particles from the feeding unit. The particles are usually fed from the feeding unit onto the substrate.

The particles are not limited to particular ones, and for example, are granulated particles containing an electrode active material and a binder. The granulated particles may contain a dispersant, an electroconductive material and/or an additive as other components, as necessary.

When the granulated particles contain an electrode active material, the electrode active material may be a positive electrode active material or a negative electrode active material. When the granulated particles are used as an electrode material for a lithium ion battery, examples of the positive electrode active material may include a metal oxide capable of being reversibly doped and undoped with lithium ions. Examples of such metal oxides may include lithium cobalt oxide ($LiCoO_2$), lithium nickel oxide (LiNiO), lithium manganese oxide ($LiMn_2O_4$), lithium iron phosphate ($LiFePO_4$), and ternary active materials obtained by substituting nickel and manganese for a part of lithium cobalt oxide (such as $LiCo_{1/3}Ni_{1/3}Mn_{1/3}O_2$). As the above-mentioned positive electrode active material as exemplified above, one type thereof may be solely used, and two or more types thereof may also be used in combination, depending on its use purpose as appropriate.

Examples of the negative electrode active material as an opposite electrode to the positive electrode for lithium ion batteries may include low crystallizable carbons (amorphous carbon) such as easily graphitizable carbon, non-graphitizable carbon, and pyrolytic carbon; graphite (natural graphite and synthetic graphite); alloy-based materials containing tin, silicon, and the like; and oxides such as silicon oxide, tin oxide, and lithium titanate). As the electrode active material as exemplified above, one type thereof may be solely used, and two or more types thereof may also be used in combination, depending on its use purpose as appropriate.

The electrode active material for lithium ion battery electrodes is preferably in a granular form uniformly granulated well. When the shape of the particles is spherical, electrodes with higher density can be formed at the time of formation of electrodes.

The volume-average particle diameters (D50) of both the positive and negative electrode active materials for lithium ion battery electrodes are preferrably 0.1 μm or more and 100 μm or less, more preferably 0.3 μm or more and 50 μm or less, and still more preferably 0.5 μm or more and 30 μm or less.

The binder that can be contained in the granulated particles is preferably a compound capable of binding the electrode active materials to each other. A more preferred binder is a dispersive binder having a property of dispersing when in a solvent. Examples of the dispersive binder may include macromolecular compounds such as a silicone-based polymer, a fluorine atom-containing polymer, a conjugated diene-based polymer, an acrylate-based polymer, a polyimide, a polyamide, and a polyurethane. Examples of the preferable dispersive binder may include a fluorine atom-containing polymer, a conjugated diene-based polymer, and an acrylate-based polymer being preferable. A conjugated diene-based polymer and an acrylate-based polymer are more preferable.

The shape of the dispersive binder is not particularly limited, and is preferably particulate. The particulate dispersive binder has good binding properties, and can suppress a drop in the capacity of the produced electrode and the deterioration of the produced electrode due to repetitive charging and discharging. Examples of the particulate binder may include an aqueous dispersion of binder particles such as latex, and a particulate binder obtained by drying such an aqueous dispersion.

The amount of the binder based on the dried mass is usually 0.1 part by mass or more and 50 parts by mass or less, preferably 0.5 part by mass or more and 20 parts by mass or less, and more preferably 1 part by mass or more and 15 parts by mass or less, relative to 100 parts by mass of the electrode active material, from the viewpoint of sufficiently ensuring adhesion between the obtained electrode active material layer and the substrate and reducing the internal resistance.

The granulated particles may use a dispersant as described above, as necessary. Examples of the specific dispersant may include cellulosic polymers such as carboxymethylcellulose and methylcellulose, and ammonium or alkali metal salts thereof. As these dispersants, one type thereof may be solely used, and two or more types thereof may also be used in combination.

The granulated particles may use an electroconductive material as described above, as necessary. Examples of the specific electroconductive material may include electroconductive carbon blacks such as furnace black, acetylene black, and Ketjen black (registered trademark of Akzo Nobel Chemicals B.V.). Among these, acetylene black and Ketjen black are preferable. Vapor-grown carbon fibers such as VGCF (registered trademark) and carbon nanotubes; graphite-based carbon materials such as expanded graphite and graphite; and graphene can also be used as the electroconductive material. As these electroconductive materials, one type thereof may be solely used, and two or more types thereof may also be used in combination.

The granulated particles are obtained using an electrode active material, a binder, and other components such as an electroconductive material added as necessary, followed by granulating. The resulting granulated particles contain at least the electrode active material and the binder. Each of the constituent components contained in the granulated particles does not exist as an individual particle, but one particle is formed by two or more components including the electrode active material and the binder as constituent components. Specifically, it is preferable that a plurality of individual particles of two or more components are bonded to form secondary particles, and that a plurality of (preferably several to several tens of) electrode active materials are bonded with the binder to form particles.

The method for producing the granulated particles is not particularly limited. The granulated particles can be produced by any known granulation method such as a fluidized bed granulation method, a spray drying granulation method, and a tumbling bed granulation method.

The volume-average particle diameter (D50) of the particles is preferably 0.1 μm or more and 1000 μm or less, more preferably 1 μm or more and 500 μm or less, and still more preferably 30 μm or more and 250 μm or less, from the viewpoint of easily obtaining the rolled particle layer having a desired thickness.

The volume-average particle diameter (D50) of the particles is a 50% volume-average particle diameter measured in a dry manner and calculated using a laser diffraction-type particle size distribution measurement device (for example, Microtrac MT3300EX II; manufactured by MicrotracBEL Corp.). The 50% volume-average particle diameter is the particle diameter at a point where the cumulative frequency accumulated from the smaller diameter side on the obtained particle size distribution (on a volume basis) reaches 50%.

The fed amount of the particles fed from the feeding unit can be adjusted as appropriate depending on the size of the substrate and the desired basis weight.

(Step (B): Conveying Step)

The step (B) is a step of conveying the fed particles.

In the production method of the present embodiment, the particles are fed onto the substrate, and are conveyed together with the substrate. The conveying speed of the particles, i.e., the conveying speed of the substrate, is preferably 1 m/min or more, more preferably 5 m/min or more, and still more preferably 10 m/min or more, and is preferably 300 m/min or less, more preferably 250 m/min or less, and still more preferably 200 m/min or less.

(Step (C): Particle Layer Forming Step)

The step (C) is a step of disposing the conveyed particles on the support unit and leveling the particles using the squeegee unit to form the particle layer between the parallel portions of the pair of stock guide units. In the step (C), the particles conveyed by the conveying unit are caused to pass through the gap between the support unit and the squeegee unit to level the particles and form the particle layer having a predetermined thickness. Also, in the production apparatus described above, since the paired stock guide units have the parallel portions including a face parallel to the end faces of the squeegee unit, the particle layer is formed between the parallel portions of the paired stock guide units.

The gap between the support unit and the squeegee unit and the distance between the parallel portions of the paired stock guide units can be appropriately selected depending on the thickness, the size, and the like of the desired rolled particle layer.

(Step (D): Rolling Step)

The step (D) is a step of rolling the particle layer using the rolling unit to form the rolled particle layer. In the step (D), for example, by adjusting the distance between the paired rolling rolls, the pressure on the particle layer can be adjusted.

When the pair of rolling rolls is used as the rolling unit, the pressing pressure to the particle layer can be adjusted by adjusting the distance between the respective rolling rolls. For example, by adjusting the difference between the distance between the support unit and the squeegee unit in the step (C) and the distance between the respective rolling rolls, the density of the rolled particle layer can be adjusted. The distance between the respective rolling rolls is usually adjusted to be shorter than the distance between the support unit and the squeegee unit. The specific distance can be appropriately adjusted depending on the thickness and density of the rolled particle layer.

The thickness of the rolled particle layer obtained in the step (D) is not limited to particular one.

(Process (F): Binder Coating Liquid Coating Step)

The production method of the present embodiment may include, as an optional step, a step of applying a binder coating liquid containing a binder onto the surface of the substrate before the step (A). In this case, in the step (A) described above, the particles are fed to the surface of the substrate onto which the binder coating liquid has been applied.

The binder contained in the binder coating liquid is preferably a compound capable of binding the particles and the substrate to each other. The binder coating liquid may contain additives such as a thickener and a surfactant in order to adjust the viscosity and wettability of the coating liquid. As the thickener and the surfactant, known ones can be used. Examples of the binder may include a styrene-butadiene rubber (SBR) aqueous dispersion, an acrylate-based polymer aqueous dispersion, a polyacrylic acid (PAA) aqueous solution, and a polyvinylidene fluoride (PVDF) organic solvent-based liquid. As the binder coating liquid, for example, a dispersion or solution containing a binder that can be contained in the particles can be used.

Furthermore, the production method according to another embodiment is preferably a production method including a step of feeding a substrate after the step (C), where the step (D) includes rolling the particle layer formed on the support unit, using the rolling unit, between the fed substrate and the support unit to transfer the rolled particle layer onto the substrate. Specifically, the production method utilizes the production apparatus for a rolled particle layer according to the third embodiment.

The production method using the production apparatus for a rolled particle layer according to the third embodiment is configured with the same contents as those described in the production method using the production apparatus for a rolled particle layer according to the first embodiment, except for the point in which the steps (A) to (C) are performed on the support unit, the point in which the step of feeding the substrate is included after the step (C), and the point in which the step (D) uses the rolling unit to roll the particle layer, which has been formed on the support unit, between the substrate and the support unit to transfer the rolled particle layer onto the substrate.

The production method of the present embodiment may include, as an optional step, a step of applying a binder coating liquid containing a binder onto the surface of the substrate between the step of feeding the substrate and the step (D).

The production method according to still another embodiment is preferably a production method including the steps (A) to (C) performed on a first substrate as a transfer substrate and further including a step of feeding a second substrate after the step (C), where the step (D) uses the rolling unit to roll the particle layer formed on the first substrate between the first substrate and the second substrate to transfer the rolled particle layer onto the second substrate, using the production apparatus according to the fourth embodiment.

<7. Rolled Particle Layer>

The production apparatus for a rolled particle layer according to the present embodiment and the production method using the same can be used for producing a rolled particle layer by rolling any optional particles.

The production apparatus for a rolled particle layer according to the present embodiment and the production method using the same may be used, without particular limitation, for producing electrode active material layers of various batteries. Specifically, it is preferable that they may be used for producing electrode active material layers of lithium ion batteries. When the substrate on which the electrode active material layer will be formed is an electroconductive substrate, the substrate and the electrode active material layer can be obtained as electrodes (electrode sheets).

According to the production apparatus for a rolled particle layer and the production method using the same according to the present embodiment, it is possible to produce a rolled particle layer having small fluctuations in the basis weight across the width thereof. The small fluctuations in the basis weight can be confirmed by a coefficient of variation of the basis weight being small.

The coefficient of variation of the basis weight in the width direction of the rolled particle layer is, for example, preferably 2% or less, more preferably 1.5% or less, still more preferably 1.1% or less, still more preferably 1% or less, and is preferably as small as possible, but may be 0% or more.

The coefficient of variation of the basis weight in the width direction of the rolled particle layer can be measured as follows.

The basis weight is measured at a plurality of positions (for example, five positions) at equal intervals along the width direction of the rolled particle layer. The plurality of positions where the basis weight is measured includes positions 5 mm inward in the width direction from the ends of the rolled particle layer in the width direction. Based on the basis weights at the plurality of positions, the coefficient of variation of the basis weight in the width direction of the rolled particle layer can be obtained by the following equation:

$$\text{Coefficient of variation (\%)} = (\text{standard deviation } \sigma \text{ basis weight})/(\text{average of basis weight}) \times 100.$$

EXAMPLES

Hereinafter, the present invention will be described in detail by illustrating Examples. However, the present invention is not limited to the Examples described below. The present invention may be optionally modified for implementation without departing from the scope of claims of the present invention and its equivalents.

In the following description, "%" and "part" representing quantity are on the basis of mass, unless otherwise specified. The operation described below was performed under the conditions of room temperature (20° C.±15° C.) and normal pressure (1 atm), unless otherwise specified.

<Evaluation Method>

(Coefficient of Variation of Basis Weight)

The coefficient of variation of the basis weight in the width direction of the negative electrode active material layer as the rolled particle layer, was determined according to the following method.

A circular test piece having a diameter of 15.95 mm and an area of 2 $cm^2$ was punched out from electrode sheets obtained in Examples and Comparative Examples by a handheld punch (manufactured by Nogami Giken Co., Ltd.). Specifically, circular test pieces were punched out at five positions at equal intervals along the width direction of the electrode sheet. The five positions included positions 5 mm inward in the width direction from the ends of the electrode sheet in the width direction.

The mass of each of the five punched test pieces was measured, and the mass (basis weight) of the negative electrode active material layer per 1 $cm^2$ was calculated. The coefficient of variation for the basis weight at five positions was determined on the basis of the following equation:

$$\text{Coefficient of variation (\%)} = (\text{standard deviation } \sigma \text{ basis weight})/(\text{average of basis weight}) \times 100.$$

The smaller the coefficient of variation is, the smaller the fluctuations in the basis weight across the width of the negative electrode active material layer is.

(Surface Condition of Electrode Sheet)

The electrode sheets obtained in Examples and Comparative Examples were visually observed from the side with the negative electrode active material layer, and the presence or absence of linear irregularities and surface roughness was evaluated. A case where there were no linear irregularities and surface roughness was evaluated as "good", and a case where there were linear irregularities and/or roughness of the surface was evaluated as "bad".

If the evaluation was "good", it was determined that there was no excessive or insufficient feeding of particles onto the substrate.

Examples 1 to 5

(Preparation of Slurry for Granulated Particles)

97.7 parts of artificial graphite (mean particle diameter: 24.5 μm, graphite interlayer distance (plane spacing (d value) of (002) plane by X-ray diffraction method): 0354 nm) as a negative electrode active material, 1.6 parts of an acrylic binder in solid content equivalent, and 0.7 part of carboxymethylcellulose (CMC) as a water-soluble macromolecule (BSH-12; DKS Co., Ltd.) in solid content equivalent were mixed, and ion-exchanged water was added thereto so that the solid content concentration became 35% by mass. Then, they were mixed and dispersed, thereby obtaining a slurry for granulated particles.

(Production of Granulated Particles)

The slurry for granulated particles was fed to a spray dryer (manufactured by Okawahara Kakoki Co., Ltd.) that used a rotary disk-system pin-type atomizer (diameter: 84 mm) at a rate of 255 mL/min. Spray-drying granulation was performed under conditions of a rotational speed of 17,000 rpm, a hot air temperature of 150° C., and a particle recovery outlet temperature of 90° C., thereby obtaining granulated particles having an average particle diameter of about 70 μm.

(Production of Negative Electrode Active Material Layer)

Next, the binder coating liquid was prepared by dispersing in water the same acrylic binder as the binder used for the granulated particles. The binder coating liquid had a solid content concentration of 30% by mass, a viscosity of 6.7 mPa·s (25±2° C., 60 rpm), and a surface tension of 32 mN/m (Wilhelmy method). In addition, a long-length copper foil having a thickness of 10 μm and a width of 250 mm was prepared as a substrate (negative electrode current collector), and set in an electrode production line (production apparatus) illustrated in FIG. 1. The line speed (conveying speed of the substrate) was as shown in Table 1.

The prepared binder coating liquid was applied by a gravure coater (coating unit 180 in FIG. 1) so that strip-shaped current collector exposed portions were secured on both end portions in the width direction of the negative electrode current collector and the coating amount thereof became about 0.003 mg/cm-between the current collector exposed portions (central region in the width direction), thereby forming a binder coating liquid layer.

Then, the prepared granulated particles were fed, by a powder feeding device (feeding unit), to the central area in the width direction of the negative electrode current collector being conveyed so that the basis weight (per one side) became 28 mg/$cm^2$. The granulated particles fed onto the negative electrode current collector were conveyed together with the negative electrode current collector to a pair of rolling rolls (in FIG. 1, the support roll 130 and the rolling roll 160) as the rolling unit provided downstream, so that fluctuations in basis weight were eliminated by a roller squeegee (in FIG. 1, the squeegee unit 140), and the height thereof in the vertical direction was leveled across the width of the negative electrode current collector to obtain a substantially uniform thickness.

At this time, by providing stock guide units (the stock guide units 150 in FIG. 1) at both end faces of the roller squeegee, the flow of the granulated particles in the current collector width direction was suppressed.

As the stock guide units, a member having a parallel portion and a projecting portion was used. The material of the stock guide unit was polytetrafluoroethylene (PTFE).

The parallel portion had a face parallel to the end face of the roller squeegee (squeegee unit). The distance W (the distance W corresponds to the width of the negative electrode active material layer as the rolled particle layer) between the faces parallel to the end faces of the roller squeegee in the parallel portions was 200 mm.

The projecting portion had a distance D3 (gap D3) between the first face (lower surface) opposed to the support roll and the peripheral surface of the support roll, where D3 was the size shown in Table 1, and also had a distance D4 (distance D4 from the thickness defining portion) between the projecting portion and the thickness defining portion of the squeegee unit, where D4 was the size shown in Table 1. The maximum thickness (thickness Ws) of the projecting portion in the width direction of the squeegee unit was the size shown in Table 1. The percentage (Ws/W×100) of the thickness Ws relative to the distance W was as shown in Table 1.

The radius R (radius of curvature R0) of the rolling roll as the support unit and the radius of curvature R1 of the face of the parallel portion facing the peripheral surface of the support roll (face 151D in FIG. 3B) were the same as each other. The contact length with the current collector on the support roll was 13.5% relative to the peripheral length of the support roll, and the gap between the current collector on the support roll was 0 mm.

The radius R of the support roll in the production apparatus was 125 mm, and the radius of the squeegee unit was 50 mm. The squeegee unit and the stock guide units were disposed such that the upstream end portion of the parallel portion of the stock guide unit was located upstream relative to the upstream end portion of the squeegee unit, and the downstream end portion of the parallel portion of the stock guide unit was located downstream relative to the downstream end portion of the squeegee unit.

Next, the granulated particle layer was rolled by the rolling roll (the rolling roll 160 in FIG. 1) disposed further downstream, whereby a negative electrode active material layer having a thickness of about 115 μm, as an electrode active material layer (rolled particle layer), was formed on the negative electrode current collector. The pressing conditions were as follows:

Interval between the support roll and the rolling roll as the rolling unit: 100 μm Linear pressure: 1 t/cm Rolling temperature: 50° C.

The resulting layered body (electrode sheet) including the negative electrode active material layer and the negative electrode current collector was evaluated by the above-described methods.

Comparative Example 1

As the stock guide units, a plate-shaped member having only a parallel portion and no projecting portion was used.

The negative electrode active material layer was formed on the negative electrode current collector by the same manner as that in Example 1 except for the above matter, to obtain a layered body, and the evaluation was performed by the above-described methods.

Production conditions and evaluation results of each of Examples and Comparative Examples are shown in the following table.

TABLE 1

| | Example 1 | Example 2 | Example 3 | Example 4 | Example 5 | Comparative Example 1 |
|---|---|---|---|---|---|---|
| Line speed [m/min] | 20 | 20 | 40 | 40 | 60 | 20 |
| Stock guide unit with or without projecting portion | with | with | with | with | with | without |
| Distance D4 from the thickness defining portion [mm] | 42.15 | 38.15 | 42.15 | 42.15 | 42.15 | — |
| Gap D3[mm] | 0.08 | 0.08 | 2 | 3 | 4 | — |
| Thickness Ws[mm] | 10 | 10 | 10 | 8 | 10 | — |
| Ws/W*100[%] | 5 | 5 | 5 | 4 | 5 | — |
| Coefficient of variation(%) | 1.4 | 1.5 | 1.1 | 1.6 | 1.4 | 5 |
| Surface condition of electrode sheet | good | good | good | good | good | bad*1 |

In Table 1, "*1" indicates that the basis weight of the end portions in the width direction of the negative electrode active material layer was larger than the average basis weight in the width direction, and the end portion of the sheet was curved.

The above-described results show that the fluctuations in the basis weight across the width of the negative electrode active material layer as the rolled particle layer can be reduced by providing the stock guide unit with the projecting portion. Furthermore, it can be seen that by providing the stock guide unit with the projecting portion, an electrode sheet as a layered body including the rolled particle layer and the substrate, the layered body having a good surface state can be obtained.

REFERENCE SIGN LIST

1 substrate
1*a* substrate
1*b* substrate
2 particle
3 particle layer
4 rolled particle layer
5 layered body
100 production apparatus
110 feeding unit
121 substrate unwinding machine (conveying unit)
130 support roll (conveying unit, support unit, rolling unit, rolling roll)
130R rotation axis
140 squeegee unit
140C center in the width direction
140E end face
140E1 upstream end portion
140E2 downstream end portion
141 thickness defining portion
150 stock guide unit
151 parallel portion
151D face
151E1 upstream end portion
151E2 downstream end portion
151P face
152 projecting portion
152D face
152*a* projecting portion
152*a*D face
152*a*S face
152*b* projecting portion
152*b*R curved portion
152*b*S curved surface
160 rolling roll (rolling unit)
170 winding machine (collection unit)
180 coating unit
200 production apparatus
230 support board (support unit)
250 stock guide unit
251 parallel portion
251E1 upstream end portion
251E2 downstream end portion
252 projecting portion
260*a*, 260*b* rolling roll (rolling unit, conveying unit)
300 production apparatus
330 support roll (conveying unit, support unit, rolling unit)
360 rolling roll

400 production apparatus
422 substrate unwinding machine
460*a*, 460*b* rolling roll (conveying unit, rolling unit)
470 substrate winding machine

The invention claimed is:

1. A production apparatus for a rolled particle layer, the apparatus comprising:

a feeding unit that feeds particles;

a conveying unit that conveys the particles fed by the feeding unit;

a support unit that supports the particles conveyed by the conveying unit;

a squeegee unit disposed above the support unit with a gap between the squeegee unit and the support unit, the squeegee unit leveling the particles at the gap to form a particle layer;

a pair of stock guide units that define a width of the particle layer; and a rolling unit that rolls the particle layer to form a rolled particle layer, wherein the squeegee unit has a thickness defining portion closest to the support unit for defining a thickness of the particle layer at the gap, each of the pair of stock guide units includes:

a parallel portion that includes a face parallel to and facing an end face of the squeegee unit and that has an upstream end portion located upstream relative to the thickness defining portion and a downstream end portion located downstream relative to the thickness defining portion; and a projecting portion that is disposed upstream relative to the thickness defining portion and protrudes toward a center in a width direction of the squeegee unit for adjusting an amount of the particles flowing to end portions in the width direction of the particle layer, and the pair of stock guide units is disposed so that a distance W between the parallel portions of the respective stock guide units corresponds to a width of the rolled particle layer.

2. The production apparatus for a rolled particle layer according to claim 1, wherein the squeegee unit has a roll shape.

3. The production apparatus for a rolled particle layer according to claim 1, wherein the projecting portion included in each of the pair of stock guide units has a first face facing the support unit, and the support unit and the first face are separated from each other.

4. The production apparatus for a rolled particle layer according to claim 3, wherein a distance between the support unit and the first face of the projecting portion included in each of the pair of stock guide units is more than 0 mm and 20 mm or less.

5. The production apparatus for a rolled particle layer according to claim 1, wherein the projecting portion included in each of the pair of stock guide units is separated from and upstream of the thickness defining portion.

6. The production apparatus for a rolled particle layer according to claim 5, wherein a distance between the thickness defining portion and the projecting portion included in each of the pair of stock guide units is 1 mm or more and 60 mm or less.

7. The production apparatus for a rolled particle layer according to claim 1, wherein the projecting portion included in each of the pair of stock guide units has a maximum thickness in a width direction of the squeegee unit of 0.1% or more and 25% or less relative to the distance W.

8. The production apparatus for a rolled particle layer according to claim 1, wherein the projecting portion included in each of the pair of stock guide units has a maximum thickness in a width direction of the squeegee unit of 1 mm or more and 100 mm or less.

9. A method for producing a rolled particle layer using the production apparatus for a rolled particle layer according to claim 1, the method comprising:

a step (A) of feeding the particles from the feeding unit;

a step (B) of conveying the fed particles by the conveying unit;

a step (C) of disposing the conveyed particles on the support unit and leveling the particles using the squeegee unit to form the particle layer between the parallel portions of the pair of stock guide units; and a step (D) of rolling the particle layer using the rolling unit to form the rolled particle layer.

* * * * *